United States Patent

Gourrier et al.

[11] Patent Number: 6,030,437
[45] Date of Patent: Feb. 29, 2000

[54] GAS PURIFIER

[75] Inventors: Serge Gourrier, Paris; Rémy Polaert, Villecresnes, both of France

[73] Assignee: U.S. Philips Corporation, New York, N.Y.

[21] Appl. No.: 09/038,563

[22] Filed: Mar. 11, 1998

[30] Foreign Application Priority Data

Mar. 11, 1997 [FR] France .................................. 97 02868

[51] Int. Cl.⁷ .................................................. B01D 46/46
[52] U.S. Cl. .................................. 96/399; 95/12; 96/417
[58] Field of Search .............................. 95/8, 11, 12, 22, 95/23; 96/399, 422, 417, 421, 405, 400, 402

[56] References Cited

U.S. PATENT DOCUMENTS

| 4,820,317 | 4/1989 | Fahey | 95/22 |
| 5,429,649 | 7/1995 | Robin | 96/405 |
| 5,461,368 | 10/1995 | Comer | 96/421 |
| 5,688,308 | 11/1997 | Voigts | 95/25 |
| 5,810,908 | 9/1998 | Gray et al. | 95/25 |

FOREIGN PATENT DOCUMENTS

| 4002843C1 | 4/1991 | Germany | A62B 23/00 |
| 52-50969 | 4/1977 | Japan | 95/23 |
| 54-2266 | 1/1979 | Japan | 95/23 |
| 63-214362 | 9/1988 | Japan | B03C 3/68 |
| 2-152515 | 6/1990 | Japan | 95/8 |
| 2218355A | 11/1989 | United Kingdom | B01D 46/54 |

*Primary Examiner*—Duane S. Smith
*Attorney, Agent, or Firm*—Ernestine C. Bartlett

[57] ABSTRACT

In a gas purifier, a gas flow is generated by a fan (15) and passed through a filter arrangement (14). A difference (SF) is measured (16, 19) between pollution levels in the gas flow before and after it has passed the filter arrangement (14). A controller (18) reduces the gas flow when the difference (SF) between the pollution levels drops below a threshold value (Th).

5 Claims, 3 Drawing Sheets

GAS PURIFIER

FIELD OF THE INVENTION

The invention relates to a gas purifier. The gas purifier may be used, for example, to clean the ambient air.

BACKGROUND OF THE INVENTION

DE 40 02 843 describes a breathing mask comprising means for judging the efficiency of the filter and for determining the moment when it is necessary to change the filter. The mask comprises for this purpose two transducers which are placed on either side of the filter to be monitored. The cited document proposes to form a differential signal from the signals provided by the two transducers, which differential signal is used for giving a warning signal when it is necessary to replace the filter. This differential signal is sent to a monitor. At the same time, the signal supplied by the sensor present downstream of the filter is compared with a limit value such that an alarm signal is triggered when this signal of the downstream sensor reaches the limit value.

SUMMARY OF THE INVENTION

It is an object of the invention to provide a gas purifier which is relatively power-efficient.

The invention takes the following aspects into consideration. In a gas purifier which generates a gas flow and passes it through a filter arrangement, there are two cases in which it is a waste of energy if the gas flow is relatively strong. First of all, generating a strong gas flow is a waste of energy if the filter arrangement is inefficient because, for example, it is not capable of absorbing pollution. Secondly, generating a strong gas flow is a waste of energy if the gas flow is sufficiently pure because, for example, the gas purifier has done its job. In either case there will be a relatively small difference between pollution levels in the gas flow before and after it has been filtered.

In accordance with the invention, the gas purifier comprises a controller which reduces the gas flow when the difference between the pollution levels drops below a threshold value. Consequently, the gas flow is automatically reduced if the filter arrangement is inefficient, or if an ambient gas is sufficiently pure. Thus the gas purifier automatically reduces its power consumption if its operation is ineffective. The invention thus provides a gas purifier which is relatively power efficient.

It should be noted that reducing the gas flow includes stopping the gas flow. For example, the controller may de-activate an arrangement which generates the gas-flow if the difference between the pollution levels drops below the threshold value.

In an embodiment, the pollution levels are measured intermittently by putting a gas-flow generator into operation from time to time. Based on the measured pollution levels, the controller can decide whether the gas-flow should be relatively strong or not.

In an alternative embodiment, the gas purifier comprises a main gas-flow generator and an auxiliary gas-flow generator for providing a main portion of the gas-flow which is controllable, and an auxiliary portion of the gas-flow which is substantially constant, respectively. In this manner, it is not necessary to start the main gas-flow generator for testing the pollution level; instead, the auxiliary gas-flow generator can be made to operate, which may or may not lead to a subsequent starting of the main gas-flow generator. The gas-measurement arrangement may comprise either two transducers arranged on either side of the filter arrangement or a single transducer placed at one side of the filter arrangement. In the latter case, the gas-flow generator has the possibility of operating in both directions, with the single transducer serving to measure the pollution upstream of the filter in a first period and then downstream of the filter in a second period.

If the gas-measurement arrangement comprises two transducers, it is also possible to invert the operating direction of the fan, which has the advantage that the two transducers are kept substantially at the same level of ageing.

These as well as other aspects of the invention will be explained in more detail in the following description of embodiments.

BRIEF DESCRIPTION OF THE DRAWINGS

The invention will be better understood from the following Figures which are given by way of example only, to which the invention is by no means limited, and which show.

DESCRIPTION OF PREFERRED EMBODIMENTS

Figure 1:
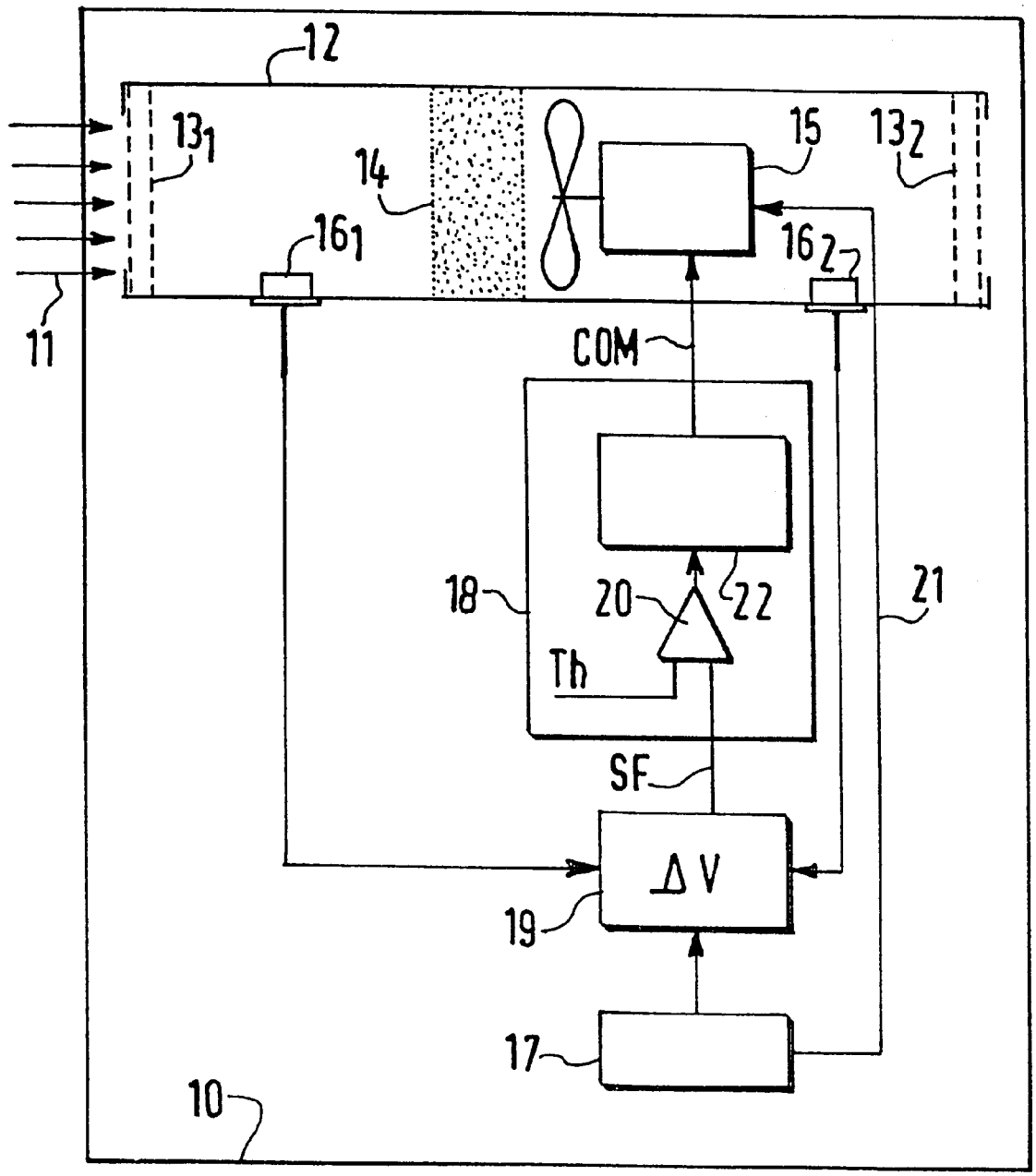
FIG. 1 is a diagram of a gas purification device according to the invention in a first embodiment.

FIG. 1 shows a purification device 10 comprising a chamber 12 with a purification filter 14 through which the gas 11 to be purified is passed, which gas is forced to pass through the filter by a fan 15. The chamber 12 is also provided with filters $13_1$, $13_2$, at the entrance and at the exit, which are mainly designed for catching dust. A first transducer $16_1$, is placed upstream of the purification filter and a second transducer $16_2$ is placed downstream of the purification filter 14. These transducers are sensitive to pollutants which are to be eliminated by the purification filter 14. The signals supplied by the two transducers are sent to comparison means 19 which supply a differential signal SF which is a measure for the filtering efficiency.

The control means 18 comprise comparison means (for example a comparator 20) followed by a control sub-assembly 22. The comparator 20 compares said differential signal SF representing the filtering efficiency with a predetermined threshold value Th. In fact, a good filtering efficiency becomes apparent from a substantial difference between the signals supplied by the upstream and downstream transducers. Inversely, a low differential signal SF points to a low filtering efficiency. In the case of an air cleaning device, it is necessary to start this device only when said filtering efficiency is of practical value and is justified by an actual pollution of the air to be filtered. On the other hand, the operation of the air purification device should be stopped if the filter is not efficient, either because it has to be changed, or because there is no pollution.

To comply with these demands, according to the invention, the control sub-assembly 22 stops the fan when the differential signal SF is lower than the threshold value Th. On the other hand, the control sub-assembly 22 causes the fan to keep running when the differential signal SF is higher than the threshold value Th. The sub-assembly 22 achieves this control by means of a control signal COM.

When the purification device is stopped by the control means, the fan and the detection means may be re-activated from time to time so as to determine once more which operational state to give to the device. To achieve this, switching means 17 start the fan (connection terminal 21) and the comparison means 19 so as to put into operation the comparison process described above.

Figure 2:
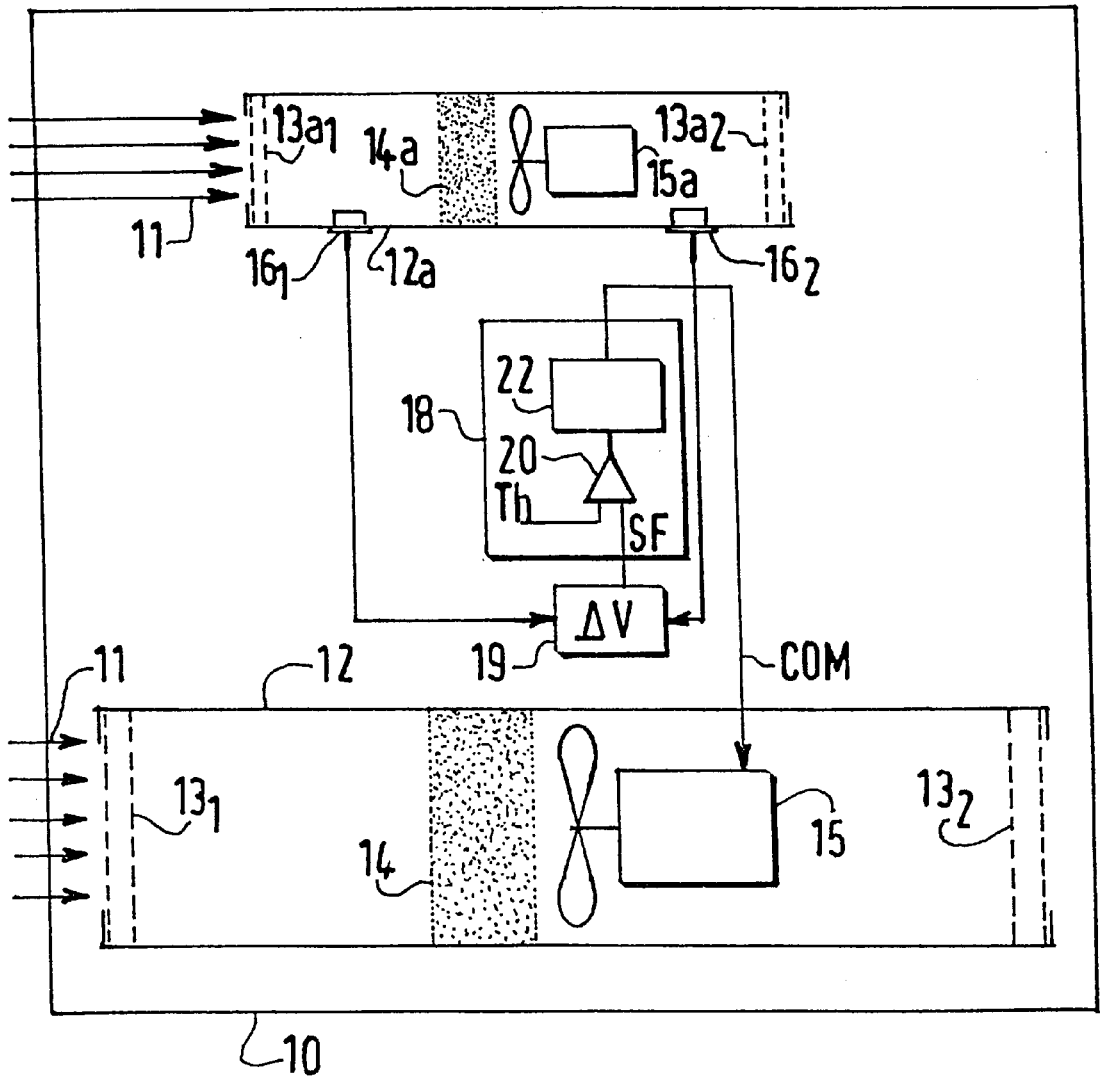
FIG. 2 is a diagram of a gas purification device according to the invention in a second embodiment, comprising an auxiliary chamber for measuring the pollution levels by means of two measuring transducers.

FIG. 2 shows an alternative embodiment of the invention. Identical elements have been given the same reference symbols. Here the measurements are not carried out in the main chamber of the device but in an auxiliary chamber so designed as to reproduce a configuration similar to that of the main chamber. The air purification device then comprises an auxiliary chamber 12a enclosing a further, auxiliary purification filter 14a. The gas 11 to be filtered, for example air, passes through the main filter 14 as well as through the auxiliary filter 14a. Filters $13a_1$, $13a_2$ are placed at the ends of the auxiliary chamber 12a for retaining dust and any other solid particles. The transducers $16_1$, $16_2$ are placed upstream and downstream of the auxiliary filter 14a. The measurements are carried out as described above with reference to the preceding embodiment. The control signal COM supplied by the control sub-assembly 22 serves to trigger the operation of the fan 15 placed in the main chamber 12. The auxiliary chamber 12a is given reduced dimensions, which accordingly also holds for the filters 14a, $13a_1$, $13a_2$ as well as for the auxiliary fan 15a. The auxiliary fan essentially takes part in carrying out the measurements, whereas the air purification is carried out essentially by the main filter 14 arranged in the main chamber provided with the main fan. An auxiliary fan of small dimensions giving rise to a reduced air flow has the advantages of a low power consumption, low noise, and low cost, which renders it possible to have it operate permanently for carrying out the measurements of the pollution levels.

The embodiment with an auxiliary chamber renders possible alternative, modified embodiments.

Figure 3:
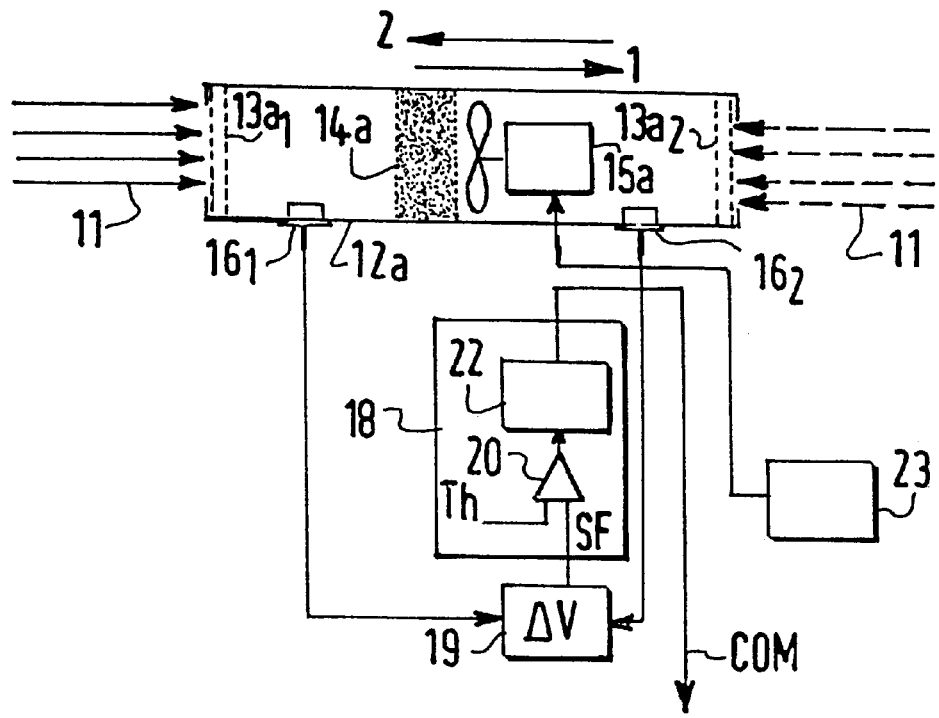
FIG. 3 is a diagram of a first modification of the diagram of FIG. 2, with an inversion of the operating direction of the fan.

The diagram of FIG. 3 shows a first modification. Here it is possible to have the auxiliary fan 15a operate alternately in one direction and in another direction, which causes gas flows either in a direction 1 or in a direction 2. The incoming gas flow 11 can enter the auxiliary chamber through either of its extremities. It is possible, for example, to have the fan operate in one direction for ten minutes and then in the opposite direction for another ten minutes. In the end, the two transducers $16_1$, $16_2$ will have been exposed to exactly the same polluting gases and will thus have become subject to substantially the same degradation. An inversion device 23 controls the inversion of the operating direction of the fan 15a.

Figure 4:
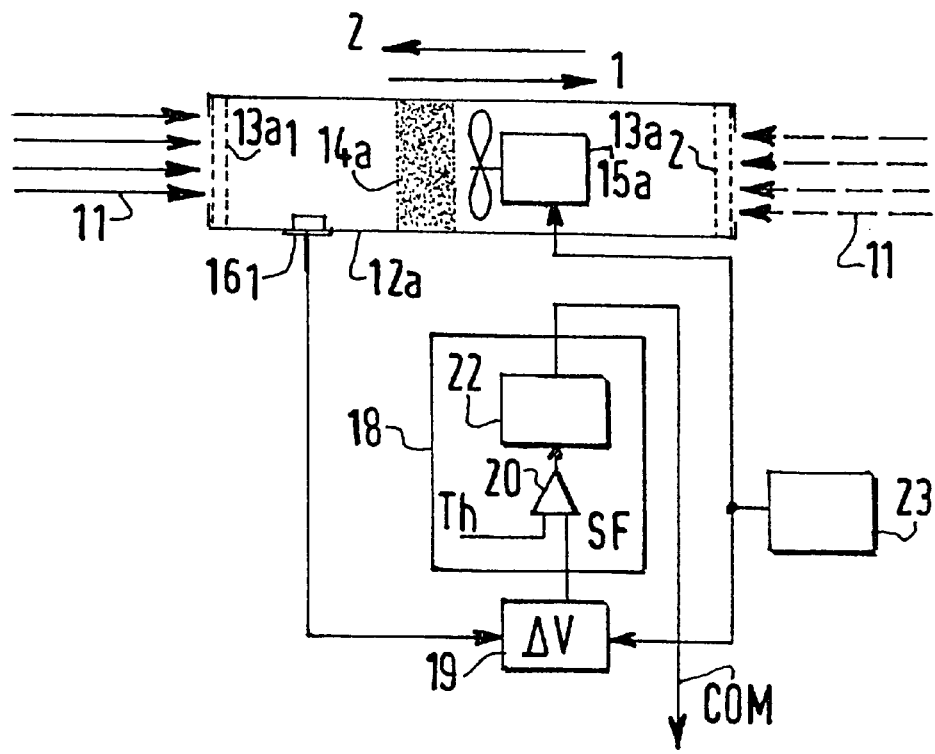
FIG. 4 is a diagram of a second modification of the diagram of FIG. 2, with an inversion of the operating direction of the fan and a single measuring transducer.

The diagram of FIG. 4 shows a second modification, in which one of the two transducers has been left out. For example, only the transducer $16_1$, is retained, which then carries out the measurements upstream and downstream of the filter in that the operating direction of the auxiliary fan 15a is changed, the gas flow in the auxiliary chamber having the direction 1 and the direction 2 in succession.

The transducer carries out a first measurement and then a second measurement in succession for each direction of flow, the first measurement being retained in the comparison means 19 until the second measurement arrives so that they can be compared. The inversion device 23 controls the inversion of the operating direction of the fan 15a and controls the comparison means 19 simultaneously. As above, it is possible, for example, to have the fan operate in one direction for ten minutes and then in the opposite direction for ten minutes. The advantage of the operation with a single transducer is firstly a cost reduction because there is only a single transducer, and secondly the avoidance of any difference in deterioration between transducers in the case in which two transducers are used.

We claim:

1. A gas purification device comprising:

a filter arrangement located in a chamber of said device;

a gas-flow generating arrangement for generating a gas-flow which passes through the filter arrangement; and a gas-measuring arrangement comprising at least one transducer for measuring a difference (SF) between pollution levels in the gas flow before and after it has passed the filter arrangement;

wherein the gas purifier comprises a controller for reducing the gas flow when the difference (SF) between the pollution levels drops below a threshold value (Th).

2. A gas purification device as claimed in claim 1, wherein the gas-flow generating arrangement comprises a switch for intermittently making the gas-flow relatively strong.

3. A gas purifier comprising:

a filter arrangement;

a gas-flow generating arrangement for generating a gas-flow which passes through the filter arrangement, said gas-flow generating arrangement comprising a main gas-flow generator and an auxiliary gas-flow generator for providing a main portion of the gas-flow which is controllable, and an auxiliary portion of the gas-flow which is substantially constant, respectively; and a gas-measuring arrangement for measuring a difference (SF) between pollution levels in the gas flow before and after it has passed the filter arrangement;

wherein the gas purifier comprises a controller for reducing the gas flow when the difference (SF) between the pollution levels drops below a threshold value (Th).

4. A gas purifier comprising:

a filter arrangement;

a gas-flow generating arrangement for generating a gas-flow which passes through the filter arrangement, said gas-flow generating arrangement comprising an inverter for inverting the direction of the gas-flow; and a gas-measuring arrangement for measuring a difference (SF) between pollution levels in the gas flow before and after it has passed the filter arrangement;

wherein the gas purifier comprises a controller for reducing the gas flow when the difference (SF) between the pollution levels drops below a threshold value (Th).

5. A gas purifier as claimed in claim 4, wherein the gas-measuring arrangement comprises:

a gas-sensor for measuring a pollution level at one side of the filter arrangement; and a comparator for comparing the pollution levels before and after the direction of the gas-flow has been inverted.

* * * * *